Patented Sept. 6, 1927.

1,641,529

UNITED STATES PATENT OFFICE.

BRUCE K. BROWN AND CHARLES BOGIN, OF TERRE HAUTE, INDIANA, ASSIGNORS TO COMMERCIAL SOLVENTS CORPORATION, OF TERRE HAUTE, INDIANA, A CORPORATION OF MARYLAND.

PYROXYLIN-LACQUER COMPOSITION.

No Drawing. Application filed December 12, 1924. Serial No. 755,571.

Our invention relates to cellulose nitrate or nitrocellulose lacquers which are known in industry as pyroxylin lacquers. The object of our invention is to provide an improved lacquer composition that may be employed to coat various kinds of surfaces by any of the ordinary methods of application—viz—such as spraying under pressure, dipping or brushing.

A pyroxylin lacquer consists of a solution of cellulose nitrate in a volatile ester solvent to which is ordinarily added a hydrocarbon diluent, such as benzol or toluol. In some cases, varnish gums are employed as a component of the lacquer to increase the covering power of the pyroxylin and to otherwise modify the properties of the lacquer film.

In the past, the greatest single difficulty encountered in the application of pyroxylin lacquers has arisen in the preparation of a solvent mixture which would properly evaporate without absorption of water, and which would leave the dried film homogeneous, coherent and adherent.

While almost any pyroxylin solution can be employed for the production of lacquer films in a dry atmosphere, great difficulty has been experienced from "blushing" when such solutions are used under practical conditions in a more or less humid atmosphere. Blushing is a phenomenon of film-whitening and weakening which is caused by the presence of water in and on the film during the application of the lacquer solution and during the evaporation of the solvents. Blushing is caused partly by the hygroscopic nature of the esters used as pyroxylin solvents, and partly by the precipitation of water on the film from the atmosphere on account of the low film temperature produced during solvent evaporation.

The blushing of lacquer films during the application of the solution and during the evaporation of the solvents from the pyroxylin may be partially overcome by the employment of a certain proportion of high-boiling ester solvents. Ordinarily, butyl acetate, amyl acetate, or similar high-boiling ester solvents are employed in pyroxylin solutions in conjunction with the cheaper ethyl acetate solvent and the hydrocarbon diluent. These high-boiling esters retard the rate of evaporation of the pyroxylin solvent mixture and carry off some water during their normal evaporation. Both of these phenomena tend to reduce "blushing."

While pyroxylin solutions containing high-boiling ester solvents such as butyl or amyl acetate, together with hydrocarbon diluents such as benzol, may be employed as lacquers, the film left after evaporation of the solvents is generally somewhat brittle, porous, and not fully adherent to the undersurface. For this reason it has been customary to add to the pyroxylin solutions a small percentage of a high-boiling "plasticizing agent" which remains in the dry film, and, which to some extent, diminishes the defects mentioned above.

Such a plasticizing agent should be possessed of the following properties:—

(a) It should be liquid to avoid ulterior crystallization in the film which would tend to destroy homogeneity;

(b) It should be chemically neutral so that it does not decompose the pyroxylin on aging;

(c) The vapor tension should be as low as possible and approximating that of the pyroxylin, so that the plasticizing agent will remain completely incorporated in the dried pyroxylin film.

Many compounds have been suggested as plasticizers for pyroxylin lacquers, among which are the following:—camphor, acetin, phthalate esters, tricresyl phosphate, and butyl tartrate. Compounds of this type are solvents of nitrocellulose and are widely used as pyroxylin lacquer plasticizers.

On the other hand, castor oil has also been widely used as a pyroxylin lacquer plasticizer for, while it is not a nitrocellulose solvent, it imparts good plastic properties to pyroxylin films. Castor oil on the other hand, is relatively unstable in admixture with pyroxylin and, on aging, it is partially decomposed with a resultant generation of acid and a degradation of the pyroxylin film.

We have found that butyl stearate is an excellent plasticizer for pyroxylin lacquer compositions as it imparts exceptional softness and plasticity to lacquer films. Butyl stearate is a plasticizer of the non-solvent type since it does not dissolve pyroxylin. While it may replace pyroxylin plasticizers of the solvent type to good advantage in some cases, it is particularly suitable as a non-solvent plasticizer to replace castor oil and similar oil plasticizers.

Butyl stearate unlike castor oil, is a stable neutral substance and lacquers containing butyl stearate are more durable than lacquers containing castor oil.

Normal butyl stearate is a colorless odorless water-white liquid boiling at 220-225° C. under 29 inches of vacuum. It solidifies with the formation of white crystals at about 22° C. under normal atmospheric pressure. At 25° C. the specific gravity of the liquid is 0.855.

We prefer to employ butyl stearate in amounts varying from twenty to fifty per cent of the weight of pyroxylin in the lacquer composition. For example, a typical formula for a pyroxylin lacquer employing butyl stearate as a plasticizer is as follows:—8 ounces pyroxylin, 4 ounces butyl stearate, 1 quart butyl acetate, 1 quart ethyl acetate, 2 quarts benzol.

While the above is a typical formula, it should be understood that the amount of butyl stearate employed may vary from 5-100% of the weight of pyroxylin, the exact proportion depending on the properties desired in the lacquer composition.

We have found that lacquers containing butyl stearate are exceptionally water-resistant, whereas in ordinary lacquer compositions prolonged contact with water greatly weakens the film and sometimes causes it to peel off. Butyl stearate is also extremely valuable in eliminating shrinkage and cracking in dried lacquer films and is, for this purpose, far superior to the plasticizers previously known in the art.

While we prefer to employ normal butyl stearate, secondary butyl stearate and isobutyl stearate can also be employed to good advantage, though they are slightly more volatile than the normal butyl compound.

While in the lacquer formula given above, no pigments were included, it is of course obvious that inert pigments or soluble dyes may be incorporated in the lacquer mixture if desired.

Now, having fully described our invention, we claim the following as new and novel.

1. A composition of matter comprising pyroxylin and butyl stearate.
2. A composition of matter comprising one hundred parts of pyroxylin and five to one hundred parts of butyl stearate.
3. A composition of matter comprising pyroxylin, butyl stearate, and a volatile solvent.
4. A composition of matter comprising pyroxylin, butyl stearate, and a volatile solvent mixture.
5. A composition of matter comprising one hundred parts of pyroxylin, five to one hundred parts of butyl stearate, and a volatile solvent mixture.
6. A composition of matter comprising pyroxylin, butyl stearate, a volatile ester solvent and a volatile hydrocarbon solvent.
7. A composition of matter comprising pyroxylin, butyl stearate, butyl acetate, ethyl acetate and a hydrocarbon diluent.
8. A composition of matter comprising pyroxylin, butyl stearate, varnish gums, and a volatile solvent mixture.
9. A composition of matter comprising pyroxylin, butyl stearate, varnish gums, pigments, and a volatile solvent mixture.
10. As an article of manufacture, a deposited lacquer film comprising pyroxylin and butyl stearate.
11. As an article of manufacture, a deposited lacquer film, comprising pyroxylin, butyl stearate, and varnish gums.
12. A new composition of matter comprising a normal butyl ester of a higher fatty acid, saturated with respect to hydrogen.
13. A new composition of matter comprising a normal butyl ester of a fatty monocarboxylic acid containing more than eight carbon atoms to the molecule, and saturated with respect to hydrogen.
14. A new composition of matter comprising butyl stearate.

BRUCE K. BROWN.
CHARLES BOGIN.